(12) United States Patent
Kano (10) Patent No.: US 10,489,107 B2
(45) Date of Patent: Nov. 26, 2019

(54) INSTRUCTION INFORMATION TRANSMITTING APPARATUS, INSTRUCTION INFORMATION TRANSMITTING SYSTEM, AND INSTRUCTION INFORMATION TRANSMITTING METHOD

(71) Applicant: Yamaha Corporation, Hamamatsu-shi, Shizuoka-Ken (JP)

(72) Inventor: Masaya Kano, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 15/923,468

(22) Filed: Mar. 16, 2018

(65) Prior Publication Data
US 2018/0275953 A1 Sep. 27, 2018

(30) Foreign Application Priority Data
Mar. 24, 2017 (JP) .................. 2017-058379

(51) Int. Cl.
*G06F 3/16* (2006.01)
*H04R 3/12* (2006.01)
(Continued)

(52) U.S. Cl.
CPC .......... *G06F 3/165* (2013.01); *G08B 3/1016* (2013.01); *H04R 3/12* (2013.01)

(58) Field of Classification Search
CPC ...... G08B 3/1016; G06F 3/165; G04G 13/02; H04R 3/12
(Continued)

(56) References Cited

U.S. PATENT DOCUMENTS 5,555,536 A 9/1996 Rolf et al.
6,816,703 B1 * 11/2004 Wood ............... G06Q 30/02
455/3.04
(Continued)

FOREIGN PATENT DOCUMENTS

JP 60-206299 A 10/1985
JP 2008-282348 A 11/2008
(Continued)

OTHER PUBLICATIONS

Extended European Search Report issued in counterpart European Application No. 18160685.6 dated Sep. 5, 2018 (seven pages).
(Continued)

*Primary Examiner* — Hemant S Patel
(74) *Attorney, Agent, or Firm* — Crowell & Moring LLP (57) ABSTRACT

A playback device capable of playing a predetermined sound at timing on the basis of an instruction of a user, even in a device in which the playback device does not have an alarm function is provided. An information processing apparatus includes at least one processing circuit configured to implement stored instructions and execute a plurality of tasks, and the plurality of tasks include: an acquisition task that acquires event information as a trigger; and a transmission task that transmits first instruction information that causes a predetermined sound to be played or play data that causes a predetermined sound to be played, to a playback device, at timing on a basis of the event information acquired by the acquisition task.

18 Claims, 10 Drawing Sheets

(51) Int. Cl.
*G08B 3/10* (2006.01)
*G04G 13/02* (2006.01)

(58) Field of Classification Search
USPC .......................................................... 700/94
See application file for complete search history.

(56) References Cited

U.S. PATENT DOCUMENTS

| | | | | | |
|---|---|---|---|---|---|
| 6,834,195 | B2* | 12/2004 | Brandenberg | ............ | G01S 5/02 340/539.11 |
| 7,657,223 | B2* | 2/2010 | Kauppinen | ............. | H04L 29/06 379/201.01 |
| 9,553,908 | B2* | 1/2017 | Chang | ...................... | H04L 65/60 |
| 2002/0082730 | A1* | 6/2002 | Capps | ..................... | H04N 21/40 700/94 |
| 2003/0045955 | A1* | 3/2003 | Janik | .................... | G10H 1/0058 700/94 |
| 2003/0142591 | A1* | 7/2003 | Baweja | .................. | G04G 13/02 368/263 |
| 2004/0034536 | A1 | 2/2004 | Hughes | | |
| 2008/0089184 | A1 | 4/2008 | Palmer | | |
| 2012/0102191 | A1* | 4/2012 | Rabii | ..................... | G06F 9/5011 709/224 |
| 2012/0263318 | A1 | 10/2012 | Millington et al. | | |
| 2013/0094667 | A1* | 4/2013 | Millington | ............ | H04L 12/282 381/104 |
| 2014/0003629 | A1 | 1/2014 | Reilly et al. | | |
| 2014/0269223 | A1* | 9/2014 | Mokhnatkina | .......... | G04G 13/02 368/73 |
| 2015/0371529 | A1* | 12/2015 | Dolecki | ................. | G08C 17/02 700/94 |
| 2016/0005302 | A1* | 1/2016 | Bates | .................... | G08B 25/008 340/501 |

FOREIGN PATENT DOCUMENTS

| | | |
|---|---|---|
| JP | 2011-54191 A | 3/2011 |
| JP | 2013-232929 A | 11/2013 |
| JP | 2014-516450 A | 7/2014 |
| JP | 2015-527796 A | 9/2015 |
| WO | WO 2017/007596 A1 | 1/2017 |

OTHER PUBLICATIONS

Japanese-language Office Action issued in counterpart Japanese Application No. 2017-058379 dated Mar. 19, 2019 with English translation (seven (7) pages).

Japanese-language Office Action issued in counterpart Japanese Application No. 2017-058379 dated Sep. 19, 2019 with English translation (eight (8) pages).

* cited by examiner

INSTRUCTION INFORMATION TRANSMITTING APPARATUS, INSTRUCTION INFORMATION TRANSMITTING SYSTEM, AND INSTRUCTION INFORMATION TRANSMITTING METHOD

CROSS REFERENCE TO RELATED APPLICATIONS

This Nonprovisional application claims priority under 35 U.S.C. § 119(a) on Patent Applications No. 2017-058379 filed in Japan on Mar. 24, 2017 the entire contents of which are hereby incorporated by reference.

BACKGROUND OF THE INVENTION

1. Field of the Invention

A preferred embodiment of the present invention relates to an information processing apparatus, an information processing system, and an information processing method that are related to an alarm function.

2. Description of the Related Art

Conventionally, a network audio system in which, by transmitting an audio signal by wireless, the audio signal is received an audio playback device to play a sound has been proposed (see Japanese Unexamined Patent Application Publication No. 2013-232929 and Japanese Unexamined Patent Application Publication (Translation of PCT Application) No. 2014-516450, for example). In the network audio system disclosed in Japanese Unexamined Patent Application Publication No. 2013-232929 and Japanese Unexamined Patent Application Publication (Translation of PCT Application) No. 2014-516450, specified audio is played at a specified time.

In the network audio system of Japanese Unexamined Patent Application Publication No. 2013-232929 and Japanese Unexamined Patent Application Publication (Translation of PCT Application) No. 2014-516450, a specific method of implementing an alarm function is scarcely disclosed. In addition, in a case in which a device that does not seem to have an alarm function is used as a playback device that plays an alarm sound, it is unknown whether or not the alarm function is able to be implemented.

SUMMARY OF THE INVENTION

In view of the foregoing, an object of a preferred embodiment of the present invention is to provide an information processing apparatus, an information processing system, and an information processing method that are able to achieve an alarm function even when a device that does not seem to have an alarm function is used as a playback device.

An information processing apparatus according to a preferred embodiment of the present invention includes at least one processing circuit configured to implement stored instructions and execute a plurality of tasks, and the plurality of tasks include: an acquisition task that acquires event information as a trigger; and a transmission task that transmits first instruction information that causes a predetermined sound to be played or play data that causes a predetermined sound to be played, to a playback device, at a timing on a basis of the event information acquired by the acquisition task.

According to a preferred embodiment of the present invention, even in a device in which a playback device does not seem to have an alarm function, a predetermined sound is able to be played at timing on the basis of an instruction of a user.

The above and other elements, features, characteristics, and advantages of the present invention will become more apparent from the following detailed description of the preferred embodiments with reference to the attached drawings.

DETAILED DESCRIPTION OF THE PREFERRED EMBODIMENTS

Figure 1:
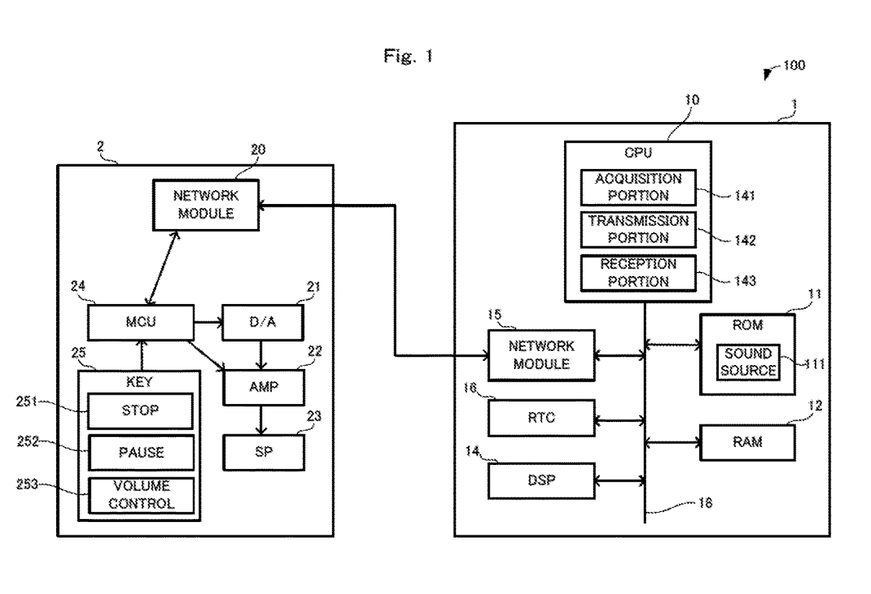
FIG. 1 is a block diagram illustrating a hardware configuration of an information processing system according to a first preferred embodiment of the present invention.

FIG. 1 is a block diagram illustrating hardware configuration of an information processing system 100 according to a first preferred embodiment of the present invention. It is to be noted that the configuration of the information processing system illustrated below is merely an example, is not limited to this configuration, and is able to be appropriately changed according to specifications.

As illustrated in FIG. 1, the information processing system 100 is provided with an AV receiver 1 and a speaker 2. The AV receiver 1 corresponds to the information processing apparatus of the present invention, and the speaker 2 corresponds to the playback device of the present invention. It is to be noted that the information processing apparatus is able to be implemented by not only the AV receiver but also a speaker provided with a CPU and a DSP, for example, a personal computer, or the like. In addition, the playback device is able to be implemented by not only a speaker but also anything that is able to play a sound.

The speaker 2 is provided with a network module 20, a D/A converter 21, an amplifier 22, a speaker unit 23, an MCU (Micro Controller Unit) 24, and a key 25.

The MCU 24 reads a program and the like that are stored in a memory inside the MCU 24, and executes various control processing. The network module 20 is an interface that performs transmission and reception of data with the AV receiver 1. As a result, the speaker 2 is able to perform the transmission and reception of data with the AV receiver 1 through the network module 20. The MCU 24 decodes audio data transmitted from the network module 20, and outputs a digital signal. The D/A converter 21 converts the digital signal into an analog signal. The amplifier 22 inputs the analog signal converted by the D/A converter 21. In addition, the MCU 24 is also able to read the audio data (audio data of a beep sound, for example) stored in a not-shown flash memory and input a digital signal of the beep sound into the D/A converter 21. It is to be noted that, in a case in which the speaker 2 is provided with the DSP, the MCU 24 is also able to instruct the DSP provided in the speaker 2, generate a digital signal of an alarm sound, and input the digital signal into the D/A converter 21. The amplifier 22 amplifies a supplied analog signal and outputs an amplified signal to the speaker unit 23. The speaker unit 23 emits a sound according to a signal supplied from the amplifier 22.

The key 25 is an operation portion provided in the speaker 2, and, for example, includes a stop button 251, a pause button 252, a volume control button 253, and the like. It is to be noted that the key 25 is not limited to the stop button 251, the pause button 252, and the volume control button 253, but also includes the operation portion provided in the speaker 2. When a user operates any of the operation portion of the key 25, operation information corresponding to an operated operation portion is transmitted to the MCU 24. The MCU 24 transmits the operation information acquired through the network module 20 to the AV receiver 1.

The AV receiver 1 is provided with a CPU 10, a ROM 11, a RAM 12 and a DSP (Digital Signal Processor) 14, a network module 15, and an RTC (Real Time Clock) 16 that are connected through a bus 18. The ROM 11 stores a sound source 111.

The CPU 10 controls each portion of the AV receiver 1. The ROM 11 is a flash memory, for example, and stores various programs for the DSP 14, data for the DSP 14, a firmware program that manages the basic operations of the AV receiver 1, various control programs, and the like. The CPU 10 reads a program and the like that are stored in the ROM 11, and executes various control processing. The RAM 12 stores various data temporarily and functions as a working area. It is to be noted that various control programs may be recorded in other recording media (an optical disk, a magnetic disk, or the like) that can be read by the AV receiver 1.

In the AV receiver 1, the ROM 11 is able to store the audio data acquired from an external device. The DSP 14, under the control of the CPU 10, reads a program or data for the DSP stored in the ROM 11, and performs various processing such as adding an effect to the audio data read from the ROM 11. In addition, the CPU 10 is able to control the DSP 14 to generate an audio digital signal. The CPU 10 outputs the audio signal to which effect addition, signal generation, or the like is performed by the DSP 14, to the network module 15.

The network module 15 is an interface that transmits and receives data to and from an external device such as a speaker 2. For example, the transmission and reception of data is able to be performed between devices such as various external drive devices, an audio device, or a personal computer through the network module 15. In addition, the AV receiver 1 is able to perform the transmission and reception of data between devices connected to a communication network such as a LAN (Local Area Network) through the network module 15. It is to be noted that the network may be constructed by either wired or wireless connections.

The ROM 11 stores a sound source 111. The sound source 111 is what is called audio data, and includes, for example, various types of sounds such as music, a conversation sound, an alarm sound, a noise sound, or a beep sound.

The RTC 16 has a clock function. The RTC 16 transmits time information to the CPU 10. As a result, the CPU 10 is able to acquire time information at any time.

The CPU 10 issues various instructions based on the information that has been input through the network module 15 and the time information that has been transmitted from the RTC 16. In the present preferred embodiment, the information that the AV receiver 1 transmits instruction information for causing the speaker 2 to play a predetermined sound. The CPU 10 is provided with an acquisition portion 141, a transmission portion 142, and a reception portion 143.

The acquisition portion 141 acquires event information as a trigger. A user inputs the event information from the outside to the AV receiver 1 through the network module 15. For example, the user inputs the event information by using application software installed in a not-shown smartphone or a personal computer that is able to communicate with the AV receiver 1. The acquisition portion 141 acquires the event information that has been input by the user, through the network module 15. The event information includes, for example, not only date and time and a start time to cause the speaker 2 to play a predetermined sound but also information such as an event, the weather, or a temperature.

The transmission portion 142 transmits a play instruction (first instruction information) that causes a predetermined sound to be played at timing on the basis of the event information acquired by the acquisition portion 141, to the speaker 2. The play instruction is an example of the first instruction information of the present invention. The CPU 10, when receiving event information, checks timing (T1) on the basis of the event information against current time information that is able to be acquired at any time from the RTC 16. The timing (T1) is time information such as date and time when an alarm is generated by the speaker 2. When the current time reaches a time of the timing (T1), the transmission portion 142 of the CPU 10 transmits a play instruction to the speaker 2. The MCU 24, when receiving the play instruction transmitted from the AV receiver 1, plays a predetermined sound (a beep sound, for example). As a result, the speaker 2 plays a predetermined sound at timing on the basis of event information. Therefore, even when the speaker 2 does not have an alarm function, the alarm function is able to be achieved in the speaker 2.

In the present preferred embodiment, a predetermined sound may be a sound originally stored in the speaker 2. In such a case, the speaker 2 plays a sound stored in an own device. Alternatively, the speaker 2 is able to play sound information transmitted from the sound source 111 of the AV receiver 1. In such a case, the CPU 10 selects audio data of a type on the basis of the event information acquired by the acquisition portion 141, from the sound source 111. The transmission portion 142 transmits selected audio data to the speaker 2. In a case in which the sound information transmitted from the sound source 111 of the AV receiver 1 is played, a sound that is not stored in the speaker 2 is able to be played. For example, even in a case in which the sound stored in the speaker 2 is only a beep sound, the music transmitted from the sound source 111 of the AV receiver 1 is able to be played. In addition, even in a case in which no sound is stored in the speaker 2, the alarm function is able to be achieved by playing the sound information transmitted from the sound source 111 of the AV receiver 1.

The reception portion 143 receives a predetermined command from the speaker 2. The predetermined command is transmitted from the speaker 2 to the AV receiver 1, for example, when a user operates the operation portion of either of the keys 25 of the speaker 2. The reception portion 143 of the AV receiver 1 receives the predetermined command corresponding to the operation portion transmitted from the speaker 2.

In the present preferred embodiment, in a case in which a user operates the stop button 251 of the speaker 2, a stop command is transmitted to the reception portion 143 of the AV receiver 1. The CPU 10 transmits a stop instruction (second instruction information) to the speaker 2 in response to the stop command. The stop instruction is an example of the second instruction information of the present invention. The transmission portion 142 transmits the stop instruction to the speaker 2. The MCU 24, when receiving the stop instruction transmitted from the AV receiver 1, stops a predetermined sound being played.

In addition, in a case in which a user operates the pause button 252 of the speaker 2, a pause command is transmitted to the reception portion 143 of the AV receiver 1. The CPU 10, in response to the pause command, transmits a pause instruction and then retransmits a play instruction (third instruction information) after a lapse of a certain time. The instruction to transmit a pause instruction and then play again after a lapse of a certain time is an example of the third instruction information on the present invention. In other words, when the CPU 10 receives the pause command, the transmission portion 142 transmits a pause instruction to the speaker 2, and records a stop time (T2) in the RAM 12. The MCU 24, when receiving the pause instruction transmitted from the AV receiver 1, stops a predetermined sound being played. The CPU 10 calculates timing (T3) in which a certain time elapses from the timing (T2) in which the speaker 2 has stopped playing. The CPU 10 checks the timing (T3) in which a certain time elapses from the timing (T2) in which the speaker 2 has stopped playing against current time information that is able to be acquired at any time from the RTC 16. When the current time reaches the timing (T3) in which a certain time elapses from the timing (T2) in which the speaker 2 has stopped playing, the transmission portion 142 of the CPU 10 retransmits a play instruction to the speaker 2. The speaker 2, when receiving the play instruction, stops a predetermined sound being played and plays a predetermined sound again after a lapse of a certain time. As a result, the information processing system 100 is able to achieve what is called a snooze function. It is to be noted that the sound that the speaker 2 plays again is not limited to the predetermined sound that has been played the first time and may be sound other than the predetermined sound.

In addition, in a case in which a user operates the volume control button 253 of the speaker 2, a volume control command is transmitted to the reception portion 143 of the AV receiver 1. The CPU 10 transmits a volume control instruction (fourth instruction information) to the speaker 2 in response to the volume control command. The volume control instruction is an example of the fourth instruction information of the present invention to change the volume of a predetermined sound. The transmission portion 142 that has received the instruction transmits, the volume control instruction to the speaker 2. The MCU 24, when receiving the volume control instruction transmitted from the AV receiver 1, transmits the volume control instruction to the amplifier 22. The amplifier 22 amplifies a supplied analog signal in accordance with the volume control instruction from the MCU 24 and outputs an amplified signal to the speaker unit 23. The speaker unit 23 emits a sound according to a signal supplied from the amplifier 22. As a result, the speaker 2 is able to emit a sound of which the volume has been controlled based on the volume control instruction. For example, in a case in which a user operates the volume control button 253 of the speaker 2 so as to increase a volume, the speaker 2 plays a predetermined sound so as to increase the volume of the predetermined sound. In addition, in a case in which a user operates the volume control button 253 of the speaker 2 so as to decrease a volume, the speaker 2 plays a predetermined sound so as to decrease the volume of the predetermined sound. As a result, the information processing system 100 is able to change the playing of a predetermined sound. It is to be noted that examples of change of a predetermined sound include intermittent playing or the change of playing speed, other than the change of the strength of a playing sound.

FIG. 2, FIG. 3, FIG. 4, and FIG. 5 are flow charts showing control performed by the information processing system 100. Hereinafter, a description will be given of an information processing method in the information processing system 100.

Figure 2:
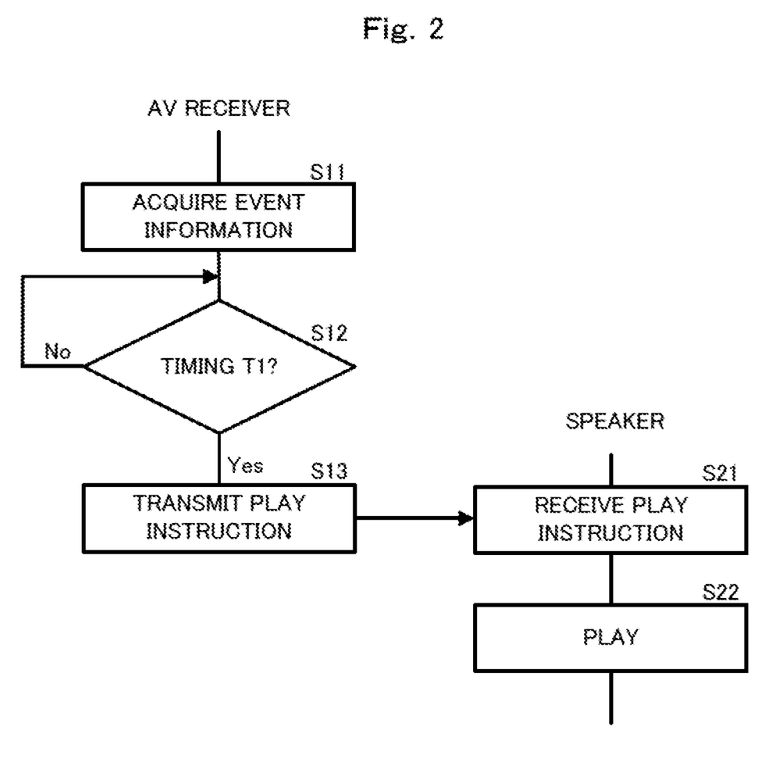
FIG. 2 is a flow chart showing control performed by the information processing system according to the first preferred embodiment of the present invention.

As illustrated in FIG. 2, first, the acquisition portion 141 acquires event information as a trigger (S11). Next, the CPU 10 checks timing (T1) on the basis of acquired event information against current time information that is able to be acquired at any time from the RTC 16. When the current time reaches the timing (T1) (S12: Yes), the transmission portion 142 transmits a play instruction that causes a predetermined sound to be played, to the speaker 2 (S13). The speaker 2, when receiving the play instruction (S21), plays a predetermined sound (S22). In a case in which the current time has not reached the timing (T1) (S12: No), the transmission portion 142 does not transmit the play instruction. Therefore, even when the speaker 2 does not seem to have an alarm function, since the speaker 2 is able to play a predetermined sound if the current time reaches the timing (T1), the alarm function is able to be achieved in the speaker 2.

Figure 3:
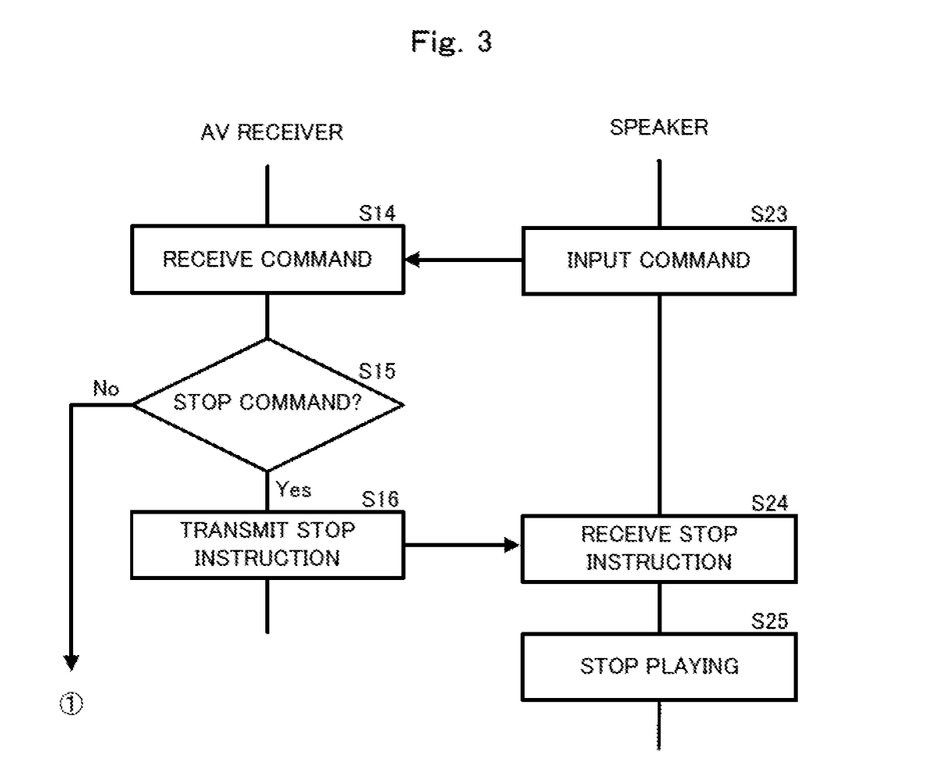
FIG. 3 is a flow chart showing control performed by the information processing system according to the first preferred embodiment of the present invention.

As illustrated in FIG. 3, when a user operates the key 25 of the speaker 2, a predetermined command is input (S23). The reception portion 143 of the AV receiver 1 receives the predetermined command from the speaker 2 (S14). Subsequently, the CPU 10 determines whether or not an input command is a stop command (S15). In a case in which the predetermined command is a stop command that indicates playing stop (S15: Yes), the transmission portion 142 of the AV receiver 1 transmits a stop instruction (second instruction information) to the speaker 2 (S16). The speaker 2 receives the stop instruction (S24), and the speaker 2 stops the playing of a predetermined sound being played (S25). In a case in which the predetermined command is not the second instruction information that indicates playing stop (S15: No), the CPU 10 shifts the current operation to a predetermined operation illustrated in FIG. 4.

Figure 4:
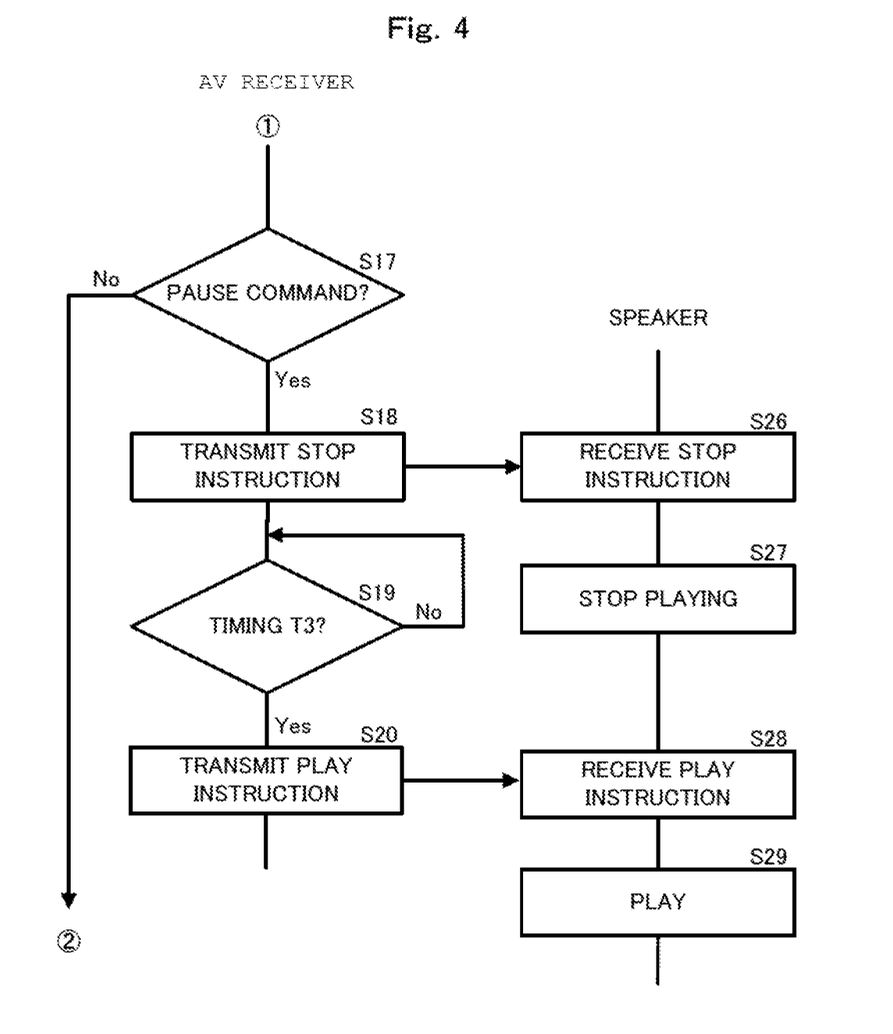
FIG. 4 is a flow chart showing control performed by the information processing system according to the first preferred embodiment of the present invention.

As illustrated in FIG. 4, in a case in which the predetermined command is a pause command (S17: Yes), the CPU 10 records a pause time (T2) in the RAM 12 in response to the pause command, and the transmission portion 142 transmits a stop instruction to the speaker 2 (S18). The speaker 2 receives the stop instruction (S26) and the speaker 2 stops the playing of the predetermined sound being played (S27). In a case in which the predetermined command is not the pause command (S17: No), the CPU 10 shifts the current operation to a predetermined operation illustrated in FIG. 5. The CPU 10 checks the timing (T3) in which a certain time elapses from the timing (T2) in which the speaker 2 has stopped playing against current time information that is able to be acquired at any time from the RTC 16. When the current time reaches the timing (T3) (S19: Yes), the transmission portion 142 of the AV receiver 1 retransmits a play instruction to the speaker 2 (S20). The speaker 2 receives the third instruction information (S28), and the speaker 2 plays a predetermined sound (S29). In a case in which the current time has not reached the timing (T3) (S19: No), the transmission portion 142 does not transmit the play instruction. As a result, what is called a snooze function is able to be achieved.

Figure 5:
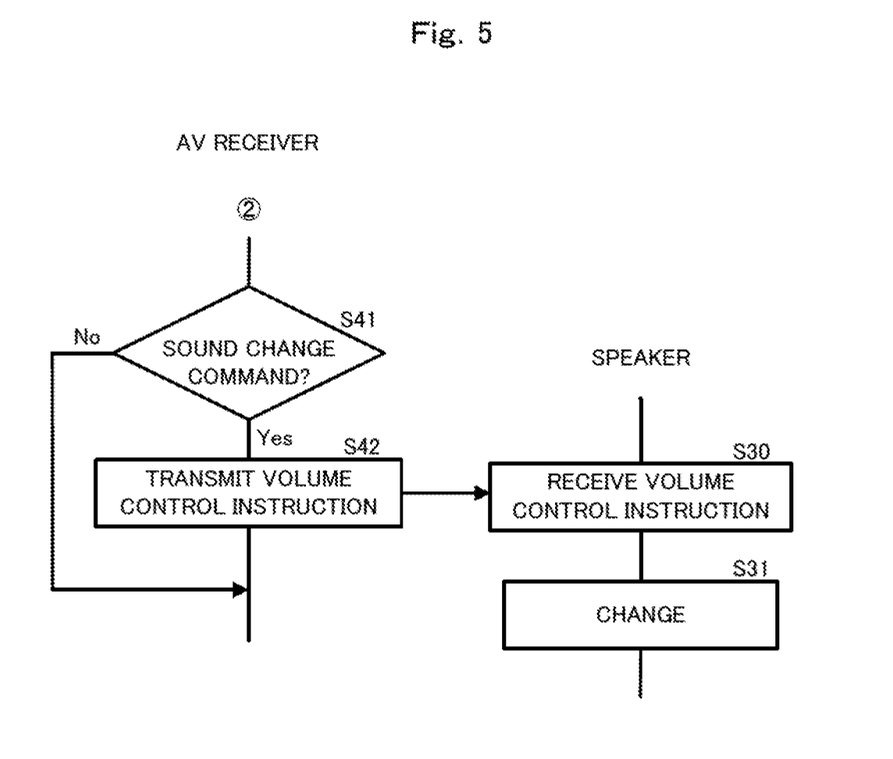
FIG. 5 is a flow chart showing control performed by the information processing system according to the first preferred embodiment of the present invention.

As illustrated in FIG. 5, in a case in which a predetermined command is a sound change command turn up the volume, for example) that indicates an instruction that changes a predetermined sound (S41: Yes), the transmission portion 142 of the AV receiver 1 transmits a volume control instruction (turn up the volume to the speaker (S42). The speaker 2 receives the volume control instruction (turn up the volume) (S30), and changes (turn up the volume) the predetermined sound being played (S31). In a case in which the predetermined command is not a sound change command (S41: No), the transmission portion 142 does not transmit an instruction to change a sound, to the speaker 2. Therefore, the speaker 2 keeps playing without changing the predetermined sound. As a result, the input of a command from the speaker 2 is able to change the playing of a predetermined sound of the speaker 2.

Hereinafter, a description is given of an information processing system 200 according to a second preferred embodiment of present invention. The information processing system 200 according to the second preferred embodiment has the same configuration as an information processing system 100 according to the first preferred embodiment except that play data in addition various instruction information is transmitted from the AV receiver 1 to the speaker 2. Therefore, the description of a configuration similar to the configuration of the information processing system 100 is omitted. In addition, the information processing system 100 according to the first preferred embodiment is referred to for a description of the information processing system 200 according to the second preferred embodiment.

In the information processing system 200 according to the second preferred embodiment, the acquisition portion 141 acquires the event information that has been transmitted by a user, through the network module 15. The CPU 10 selects data from the sound source 111 based on the event information acquired by the acquisition portion 141, and defines the data as play data. The transmission portion 142 transmits a play instruction (first instruction information) that causes a predetermined sound to be played at timing on the basis of the event information acquired by the acquisition portion 141, and the play data, to the speaker 2. As a result, the speaker 2 plays the predetermined sound on the basis of the play data at timing on the basis of the event information. Therefore, even when the speaker 2 does not seem to have an alarm function, the alarm function is able to be achieved in the speaker 2.

In the present preferred embodiment, the CPU 10, when selecting the play data from the sound source 111, is able to simultaneously select a plurality of types of sounds from the sound source 111 as a predetermined sound. The CPU 10 is able to select, for example, an alarm sound that indicates that the current time reaches a predetermined time and music that indicates the weather of the day as play data from the sound source 111. The transmission portion 142 transmits selected play data to the speaker 2. As a result, the speaker 2 is able to play a plurality of types of sounds stored in the sound source 111 without reading the audio data stored in the memory of the MCU 24 of the speaker 2.

The reception portion 143 of the AV receiver 1 receives a predetermined command. For example, in the case in which a user operates the stop button 251 of the speaker 2, a playing stop command is transmitted to the reception portion 143 of the AV receiver 1. When the CPU 10 receives the playing stop command, the transmission portion 142 transmits a stop instruction to the speaker 2. At the same time, the transmission portion 142 stops the transmission of the play data to the speaker 2. As a result, the play data is not transmitted from the AV receiver 1 to the speaker 2, and the MCU 24, when receiving the stop instruction transmitted from the AV receiver 1, stops a predetermined sound being played.

In the case in which a user operates the pause button 252 of the speaker 2, the speaker 2 transmits a pause command to the reception portion 143 of the AV receiver 1. When the CPU 10 receives the pause command, the transmission portion 142 transmits a stop instruction to the speaker 2. At the same time, the transmission portion 142 stops the transmission of the play data to the speaker 2. When the timing (T2) in which the speaker 2 has stopped playing reaches the timing (T3) in which a certain time elapses, the transmission portion 142 retransmits, a play instruction to the speaker 2. At the same time, the transmission portion 142 transmits the play data to the speaker 2. As a result, the play data is retransmitted from the AV receiver 1 to the speaker 2, and the speaker 2 is able to play a predetermined sound at the timing (T3). In other words, what is called a snooze function is able to be achieved in the speaker 2.

Figure 6:
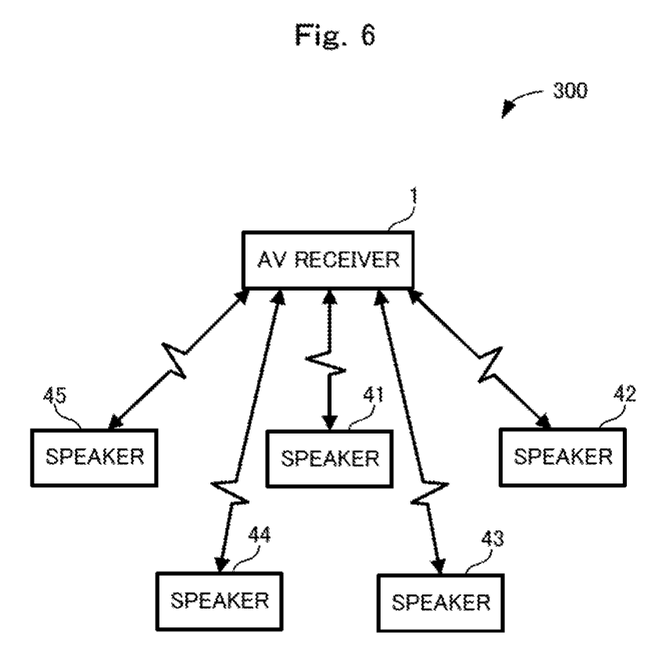
FIG. 6 is a conceptual view illustrating an information processing system according to a third preferred embodiment of the present invention.

FIG. 6 is a conceptual view illustrating an information processing system 300 according to a third preferred embodiment of the present invention. The information processing system 300 has the same configuration as the information processing system 100 or the information processing system 200 except that a plurality of speakers are included. Therefore, the description of a configuration similar to the configuration of the information processing system 100 or the information processing system 200 is omitted.

As illustrated in FIG. 6, the information processing system 300 is provided with the AV receiver 1 and a plurality of speakers 41, 42 43, 44, and 45. The AV receiver 1 is connected to each of the plurality of speakers 41 to 45 through a communication network such as the Internet or the LAN (Local Area Network) and is able to mutually perform the transmission and reception of data. It is to be noted that the network may be constructed by either wired or wireless connections.

The AV receiver 1 transmits the first instruction information or play data that causes a predetermined round of a different type to be played, to each of the plurality of speakers 41 to 45. For example, the speakers 41 to 45 may be arranged in different rooms, respectively, and may be used by different users. In a case in which a user of each of the speakers 41 to 45 uses the speakers 41 to 45 as an alarm, the user individually inputs required event information to the AV receiver 1. As a result, the AV receiver 1 is able to play a predetermined sound on the basis of the event information that the user has input, in each of the speakers 41 to 45. Therefore, each of the speakers 41 to 45 is able to emit a different sound at a different time.

In addition, when a user operates the key 25 for each of the speakers 41 to 45, the speakers 41 to 45 individually transmit a predetermined command to the reception portion 143 of the AV receiver 1. As a result, each of the speakers 41 to 45 is able to be operated.

It is to be noted that, while the present preferred embodiment exemplifies the information processing method of the information processing system 100 in a case in which communication between the AV receiver 1 and the speaker 2 is normal, the following first modification example, second modification example, third modification example, and fourth modification example enable the information processing system 100 to be adapted also to the case in which the communication between the AV receiver 1 and the speaker 2 is not normal. Hereinafter, a description is given of the first to fourth modification examples. It is to be noted that the description of a configuration similar to the configuration of the information processing method of the information processing system 100 is omitted.

Figure 7:
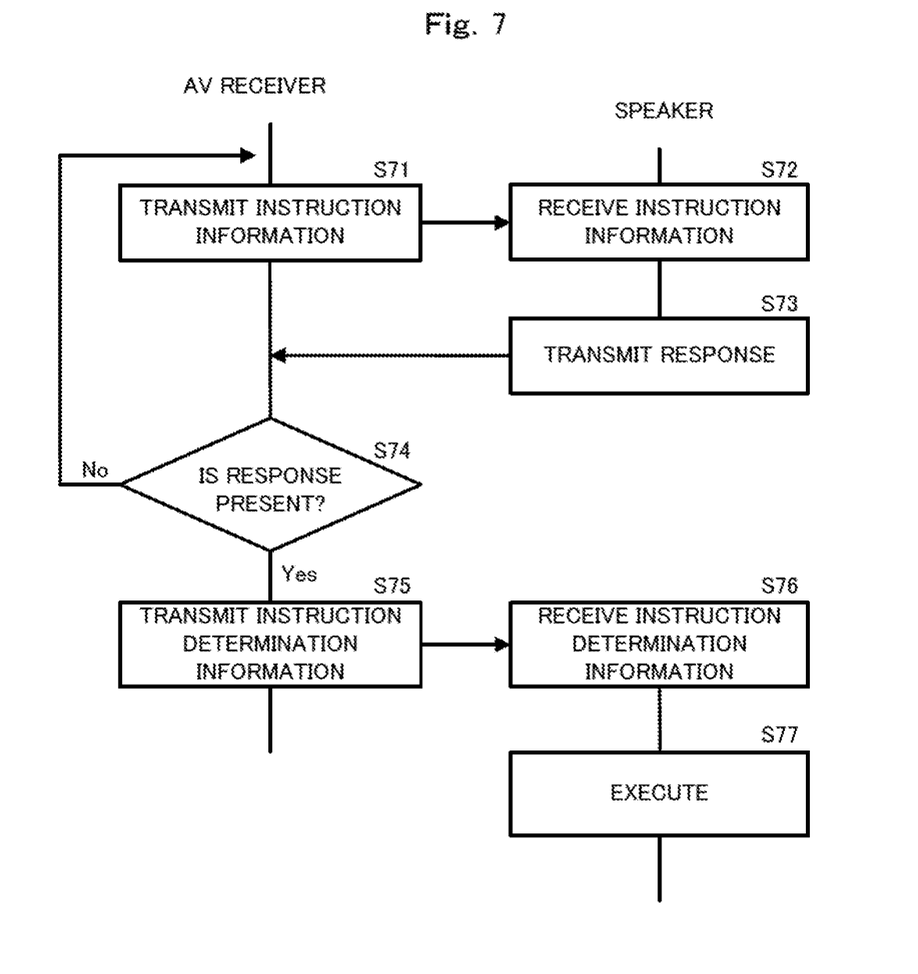
FIG. 7 is a flow chart showing control of an information processing method according to a first modification example of the present invention.

FIG. 7 is a flow chart showing control of the information processing method according to the first modification example of the present invention. As illustrated in FIG. 7, in the first modification example, the CPU 10 transmits instruction information on the basis of acquired event information to the speaker 2 (S71). The speaker 2, when receiving the instruction information (S72), transmits a response indicating the reception of the instruction information, to the AV receiver 1 (S73). In the present preferred embodiment, in a case in which the communication between the AV receiver 1 and the speaker 2 is not normal, the AV receiver 1 is not able to obtain the response from the speaker 2. Subsequently, the CPU 10 determines whether or not a response from the speaker 2 is present (S74). In a case in which a response from the speaker 2 is present (S74: Yes), the CPU 10 transmits instruction determination information to the speaker 2 (S75). The speaker 2, when receiving the instruction determination information (S76), executes a predetermined operation according to instruction information (S77). For example, in a case in which the instruction information indicates play of a predetermined sound, the speaker 2 plays the predetermined sound, which achieves an alarm function. In a case in which a response from the speaker 2 is absent (S74: No), the CPU 10 transmits setting information to the speaker 2 again (S71). In this manner, in the case in which the communication between the AV receiver 1 and the speaker 2 is not normal, the CPU 10 repeats to transmit setting information until reception of a response from the speaker 2, or the predetermined number of times or for a predetermined time. As a result, even in a case in which an abnormality occurs in the communication between the AV receiver 1 and the speaker 2 temporarily, an alarm or the like is able to be set to the speaker 2.

Figure 8:
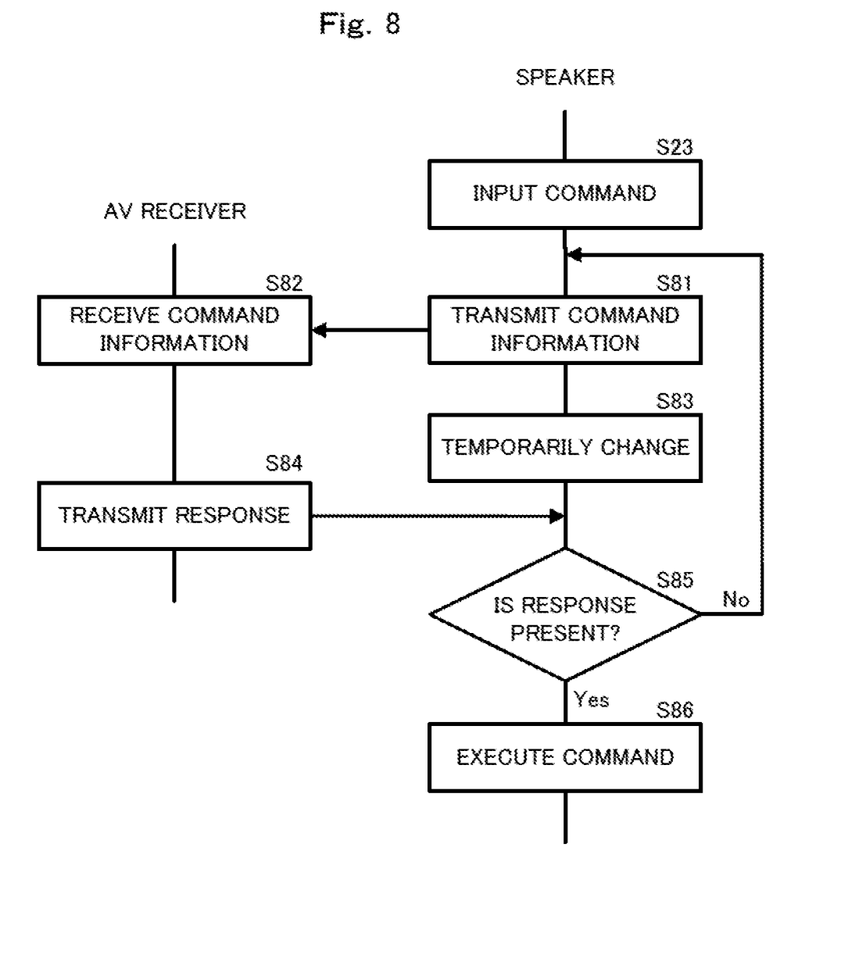
FIG. 8 is a flow chart showing control of an information processing method according to a second modification example of the present invention.

FIG. 8 is a flow chart showing control of the information processing method according to the second modification example of the present invention. As illustrated in FIG. 8, in the second modification example, when a user operates the key 25 of the speaker 2, a predetermined command is input (S23). Subsequently, the speaker 2 transmits the input command information to the AV receiver 1 (S81), and changes an operation that the speaker 2 is performing temporarily (S83). For example, the speaker 2 stops playing a predetermined sound being played. The AV receiver 1, when receiving command information (S82), transmits a response indicating the reception of the command information, to the speaker 2 (S84). The MCU 24 determines whether or not a response from the AV receiver 1 is present (S85). In a case in which a response from the AV receiver 1 is present (S85: Yes), the MCU 24 executes a command according to the command information (S86). In other words, in a case in which a predetermined command is a stop command that indicates playing stop the speaker 2 stops playing a predetermined sound being played. As a result, even when a different command is being executed temporarily, a current process is changed to a process on the basis of the command information, and the command is executed. In a case in which a response from the AV receiver 1 is absent (S85: No), the MCU 24 retransmits the command information the AV receiver 1 (S81). In this manner, in the case in which the communication between the AV receiver 1 and the speaker 2 is not normal, the MCU 24 repeats to transmit setting information until reception of a response from the AV receiver 1, or the predetermined number of times or for a predetermined time. As a result, even in the case in which an abnormality occurs in the communication between the AV receiver 1 and the speaker 2 temporarily, a predetermined command is able to be executed to the speaker 2.

Figure 9:
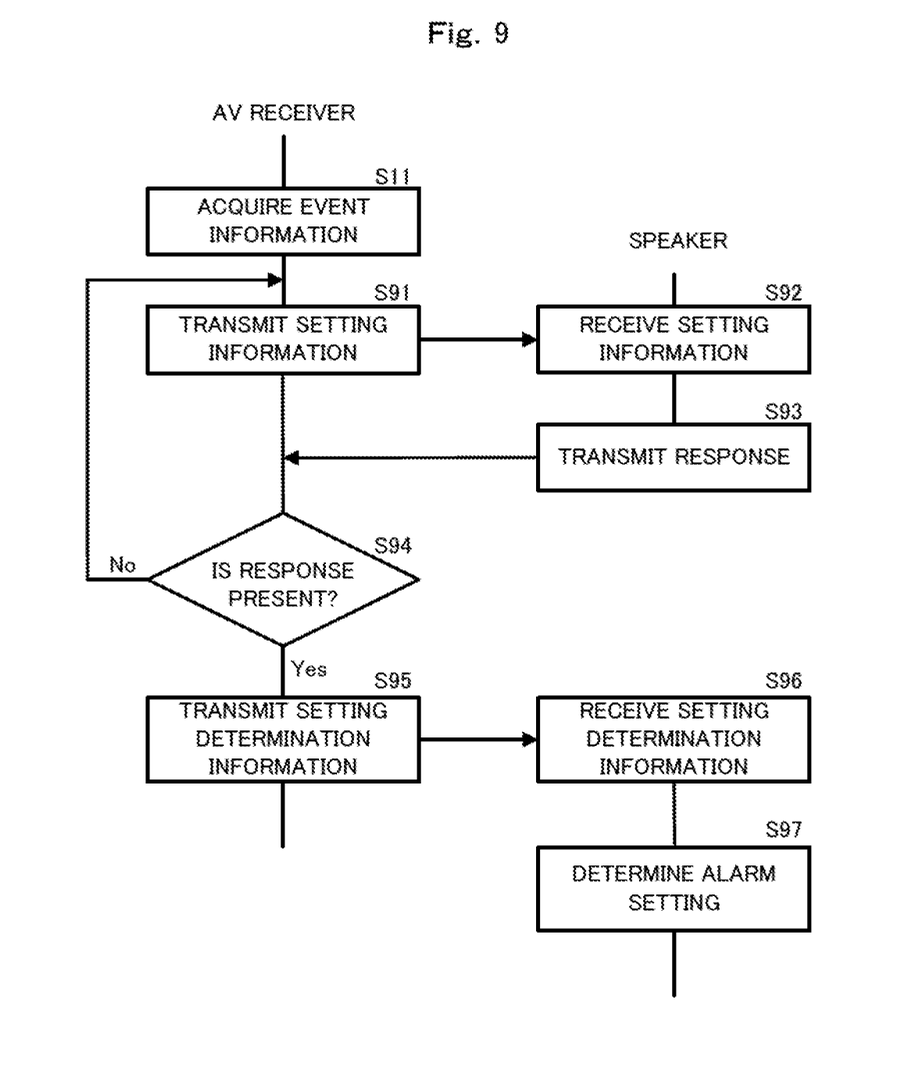
FIG. 9 is a flow chart showing control of an information processing method according to a third modification example of the present invention.

FIG. 9 is a flow chart showing control of the information processing method according to the third modification example of the present invention. In the third modification example, the configuration is different from the configuration of the information processing system 100 in that the speaker 2 has a not-shown RTC. As illustrated in FIG. 9, the acquisition portion 141 acquires event information as a trigger (S11). Subsequently, the CPU 10 transmits setting information on the basis of acquired event information to the speaker 2 (S91). The speaker 2, when receiving the setting information (S92), transmits a response indicating the reception of the setting information, to the AV receiver 1 (S93). In the present preferred embodiment, in a case in which the communication between the AV receiver 1 and the speaker 2 is not normal, the AV receiver 1 is not able to obtain the response from the speaker 2. Subsequently, the CPU 10 determines whether or not a response from the speaker 2 is present (S94). In a case in which a response from the speaker 2 is present (S94: Yes), the CPU 10 transmits setting determination information to the speaker 2 (S95). The speaker 2, when receiving the setting determination information (S96), determines the setting of an alarm (S97). Since the speaker 2 has the not-shown RTC, an alarm is set based on the RTC of the speaker 2, and the setting of the alarm is recorded in the memory of the MCU 24. When time of the RTC of the speaker 2 reaches a set time, the MCU 24 causes a predetermined sound to be played, which achieves an alarm function. In a case in which a response from the speaker 2 is absent (S94: No), the CPU 10 retransmits setting information to the speaker 2 (S91). In this manner, in the case in which the communication between the AV receiver 1 and the speaker 2 is not normal, the CPU 10 repeats to transmit setting information until reception of a response from the speaker 2, or the predetermined number of times or for a predetermined time. As a result, even in the case in which an abnormality occurs in the communication between the AV receiver 1 and the speaker 2 from a setup time to an alarm scheduled time, an alarm or the like is able to be set to the speaker 2.

Figure 10:
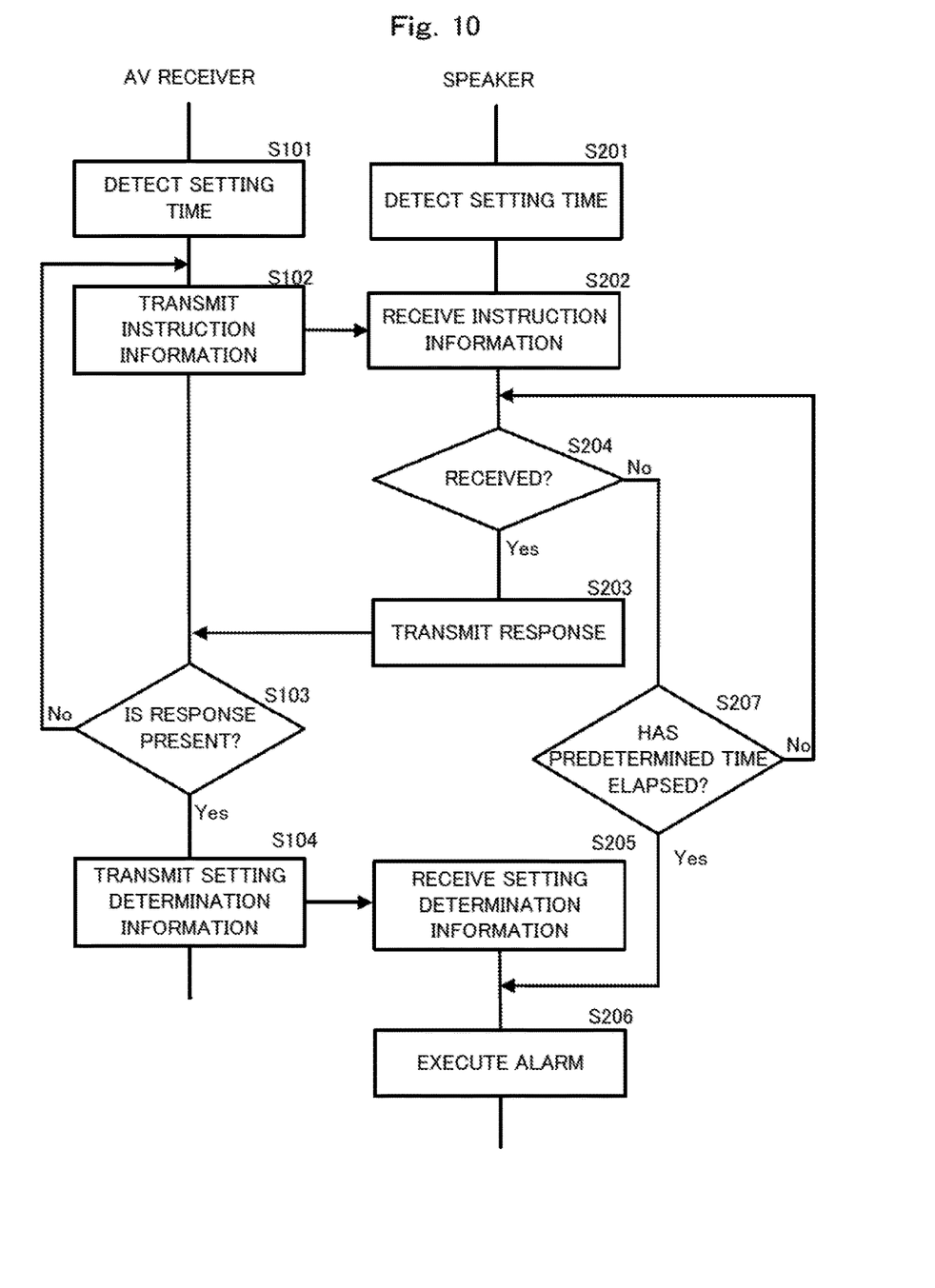
FIG. 10 is a flow chart showing control of an information processing method according to a fourth modification example of the present invention.

FIG. 10 is a flow chart showing control of the information processing method according to the fourth modification example of the present invention. In the fourth modification example, the configuration is different from the configuration of the information processing system 100 in that the speaker 2 has a not-shown RTC. As illustrated in FIG. 10, the CPU 10 detects a setting time on the basis of the acquired event information (S101). Similarly, the MCU 24 detects the setting time on the basis of the acquired event information (S201). When the CPU 10 detects the setting time, the CPU 10 transmits instruction information to the speaker 2 (S102). The speaker 2, when receiving the instruction information (S202), transmits a response indicating the reception of the setting information, to the AV receiver 1 (S203). In a case in which a response from the speaker 2 is present (S103: Yes), in other words, in a case in which the speaker 2 receives the instruction information within a predetermined time after the MCU 24 detects the setting time (S204: Yes), the CPU 10 transmits setting determination information to the speaker 2 (S104). The speaker 2 when receiving the setting determination information (S205), plays a predetermined sound and executes an alarm (S206).

In addition, in a case in which a response from the speaker 2 is absent (S103: No), the CPU 10 retransmits the instruction information to the speaker 2 (S102). In this manner, in the case in which the communication between the AV receiver 1 and the speaker 2 is not normal, the CPU 10 repeats to transmit the instruction information until the reception of a response from the speaker 2, or the predetermined number of times or for a predetermined time. As a result, even in the case in which an abnormality occurs in the communication between the AV receiver and the speaker 2 after the AV receiver 1 detects the setting time, an alarm or the like is able to be achieved in the speaker 2.

Further, in a case in which the speaker 2 does not receive the instruction information (S204: No) after the MCU 24 detects the setting time, and then a predetermined time elapses (S207: Yes) after the MCU 24 detects the setting time, the speaker 2, without receiving the setting determination information, executes an alarm (S206). In a case in which time does not reach a predetermined time (S207: NO) after the MCU 24 detects the setting time, the MCU 24 again determines whether or not the MCU 24 receives instruction information (S204). As a result, even in the case in which an abnormality occurs in the communication between the AV receiver 1 and the speaker 2 after the speaker 2 detects the setting time, an alarm or the like is able to be achieved in the speaker 2.

It is to be noted that, while, in the present preferred embodiment, a stop command when a user operates the stop button 251, a pause command when a user operates the pause button 252, and a volume control command when a user operates the volume control button 253 are transmitted to the reception portion 143 of the AV receiver 1, the association between the button of the speaker 2 and a command is not limited to this example. For example, a power button may be associated with a stop command, and a button other than the power button may be associated with a pause command or a volume control command.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An instruction information transmitting apparatus comprising:
at least one processing circuit configured to implement stored instructions and execute a plurality of tasks, wherein the plurality of tasks include:
an acquisition task that acquires event information as a trigger;
a transmission task that transmits first instruction information that causes a predetermined sound to be played or play data that causes a predetermined sound to be played, to a playback device, at timing on a basis of the event information acquired by the acquisition task; and
a reception task that receives a predetermined command from the playback device, and
wherein the transmission task, when the reception task receives the predetermined command from the playback device, transmits second instruction information that causes playing of the predetermined sound to be stopped, to the playback device.

2. The instruction information transmitting apparatus according to claim 1, wherein the transmission task retransmits third instruction information that causes the predetermined sound or other predetermined sounds to be played after a lapse of a certain time from stop of the playing of the predetermined sound, to the playback device.

3. The instruction information transmitting apparatus according to claim 1, wherein the transmission task transmits fourth instruction information that changes the predetermined sound, to the playback device.

4. The instruction information transmitting apparatus according to claim 1, further comprising a reception task that receives a predetermined command from the playback device, wherein the transmission task, when the reception task receives the predetermined command from the playback device, stops transmission of the play data.

5. The instruction information transmitting apparatus according to claim 1, wherein the transmission task retransmits the play data or other play data to the playback device after a lapse of a certain time from stop of transmission of the play data.

6. The instruction information transmitting apparatus according to claim 1, wherein the predetermined sound includes a sound of a plurality of types of sound sources.

7. The instruction information transmitting apparatus according to claim 1, wherein the transmission task, when a plurality of playback devices are present, transmits first instruction information that causes each playback device to play the predetermined sound of different types or play data, to each of the playback devices.

8. An instruction information transmitting system comprising:
the instruction information transmitting apparatus according to claim 1; and
a playback device.

9. The instruction information transmitting system according to claim 8, further comprising a reception task that receives a predetermined command from the playback device, wherein the transmission task, when the reception task receives the predetermined command from the playback device, transmits second instruction information that causes playing of the predetermined sound to be stopped, to the playback device.

10. The instruction information transmitting system according to claim 9, wherein the transmission task retransmits third instruction information that causes the predetermined sound or other predetermined sounds to be played after a lapse of a certain time from stop of the playing of the predetermined sound, to the playback device.

11. The instruction information transmitting system according to claim 10, wherein the transmission task transmits fourth instruction information that changes the predetermined sound, to the playback device.

12. The instruction information transmitting system according to claim 8, further comprising a reception task that receives a predetermined command from the playback device, wherein the transmission task, when the reception task receives the predetermined command from the playback device, stops transmission of the play data.

13. The instruction information transmitting system according to claim 8, wherein the transmission task retransmits the play data or other play data to the playback device after a lapse of a certain time from stop of transmission of the play data.

14. The instruction information transmitting system according to claim 8, wherein the predetermined sound includes a sound of a plurality of types of sound sources.

15. The instruction information transmitting system according to claim 8, wherein the transmission task, when a plurality of playback devices are present, transmits first instruction information that causes each playback device to play the predetermined sound of different types or play data, to each of the playback devices.

16. An instruction information transmitting method comprising:
acquiring event information as a trigger;
transmitting first instruction information that causes a predetermined sound to be played or play data that causes a predetermined sound to be played, to a playback device, at timing on a basis of acquired event information;
receiving a predetermined command from the playback device; and
transmitting, when the predetermined command is received from the playback device, second instruction information that causes playing of the predetermined sound to be stopped, to the playback device.

17. The instruction information transmitting apparatus according to claim 1, wherein the acquisition task acquires the event information through an external device.

18. The instruction information transmitting method according to claim 16, further comprising:
acquiring the event information through an external device.

* * * * *